Aug. 2, 1966 T. P. HIGNETT ETAL 3,264,085
HIGH ANALYSIS AMMONIUM PYROPHOSPHATE PROCESS AND PRODUCT
Filed Feb. 1, 1965 2 Sheets-Sheet 1

Travis P. Hignett
John G. Getsinger INVENTORS.
BY Robert A. Petruck
Agent 3,264,085
HIGH ANALYSIS AMMONIUM PYROPHOSPHATE
PROCESS AND PRODUCT
Travis P. Hignett, Sheffield, and John G. Getsinger, Florence, Ala., assignors to Tennessee Valley Authority, a corporation of the United States
Filed Feb. 1, 1965, Ser. No. 429,687
2 Claims. (Cl. 71—34)

The invention herein described may be manufactured and used by or for the Government for governmental purposes without the payment to us of any royalty therefor.

This application is a continuation-in-part of our copending application Serial No. 227,664, filed September 27, 1962, and now U.S. Patent No. 3,228,752; which copending application in turn is a division of a second copending application Serial No. 136,960, filed September 8, 1961, and now U.S. Patent No. 3,171,733; both of said copending applications filed for High-analysis Ammonium Polyphosphate Fertilizer.

Our invention relates to a new high-analysis solid fertilizer material suitable for preparing high-analysis liquid mixed fertilizers, and more particularly to a solid fertilizer material produced by reacting anhydrous ammonia and highly concentrated phosphoric acid.

Heretofore, liquid mixed fertilizers having compositions similar to those of standard dry mixed fertilizers have been well known, and such fertilizers are increasing in popularity in the industry. Such solutions have numerous advantages over dry mixed fertilizers in that the costs of evaporating moisture and bagging the product are eliminated. Such liquid fertilizers greatly simplify the operation of applying plant nutrients to the soil.

However, liquid fertilizers have in the past had some outstanding disadvantages. Raw-material costs have proved to be relatively high, and the solutions produced have been so corrosive as to result in high maintenance and storage costs. The liquid fertilizer solutions produced by the prior-art methods also have been limited to a maximum content of plant food of about 33 weight percent. This upper limit of available plant nutrients in prior-art solutions results from the fact that solutions having concentrations in excess of this amount always have been found to crystallize and precipitate salts out of solution when stored at or below room temperature.

A recent breakthrough in the above-mentioned maximum content of plant-food units in liquid mixed fertilizers is shown in U.S. Letters Patent 2,950,961, Marcus M. Striplin, Jr. et al., assigned to the assignee of the present invention. Striplin teaches the production of liquid mixed fertilizers which ordinarily contain as much as 60 weight percent plant food. Thus, unusually high percent of plant-food content is obtained in his process by ammoniating superphosphoric acid under controlled conditions. Superphosphoric acid, a concentrated phosphoric acid having generally from about 72 percent to about 85 percent $P_2O_5$ content, is rapidly becoming a popular raw material in the fertilizer industry for the production of liquid fertilizers.

The term "superphosphoric acid" used in this specification and claims is defined as a phosphoric acid containing substantial quantities of both ortho- and polyphosphoric acids. These polyphosphoric acids include pyrophosphoric acid and other polymers from the tri- to the nonapolymer and higher. The proportions of polyphosphoric acids vary with the $P_2O_5$ content of the superphosphoric acid. The Canadian Journal of Chemistry, vol. 34 (1956), page 790, shows that superphosphoric acid in the range from 69.81 to 84.95 percent $P_2O_5$ contains the following proportions of orthophosphoric acid and polyphosphoric acids, expressed as percent of total phosphorus.

| | Percent |
|---|---|
| Ortho- | 97.85 to 2.32 |
| Pyro- | 2.15 to 49.30 |
| Tri- | 0.00 to 24.98 |
| Tetra- | 0.00 to 16.99 |
| Penta- | 0.00 to 12.64 |
| Hexa- | 0.00 to 9.75 |
| Hepta- | 0.00 to 8.62 |
| Octa- | 0.00 to 7.85 |
| Nona- | 0.00 to 6.03 |
| Higher polymers | 0.00 to 29.41 |

Alternatively, if wet-process phosphoric acid is concentrated from the usual maximum of about 54 percent $P_2O_5$ up to the range of about 65 to 76 percent $P_2O_5$ by a process such as shown in a copending application of John G. Getsinger, Serial No. 835,377, filed August 21, 1959, and assigned to the assignee of the present invention, the distribution of ortho-, pyro-, and higher polymers of the polyphosphoric acids will be somewhat dissimilar to that shown in the above-mentioned Canadian Journal of Chemistry. The presence of the impurities in such concentrated wet-process phosphoric acid, and the $H_2O:P_2O_5$ ratio in acid so concentrated is believed to somewhat alter the distribution of the various polymers in this system.

The term "superphosphoric acid" has become widely accepted in the industry during the past several years and it, or its analogy, polyphosphoric acid, is a generic term used to define the phosphoric acids having less water of constitution than orthophosphoric acid. Whereas orthophosphoric acid contains one atom of phosphorous per molecule and has a theoretical mol ratio of water to phosphorous pentoxide of 3.0 or greater, the polyphosphoric acids have two or more atoms of phosphorus in a chain or ring structure in alternating sequence with oxygen, and a theoretical mol ratio of water to phosphorus pentoxide less than 3. Polyphosphoric acid has two general forms, the acyclic and the cyclic, commonly called metaphosphoric acid. In the acyclic form, which is derived by limited molecular dehydration of orthophosphoric acid, the individual chains of phosphorus and oxygen atoms have terminal ends and a theoretical mol ratio of water to phosphorus pentoxide between 2 and 3. In metaphosphoric acid, which is derived from the acyclic form by continued molecular dehydration, the chain is endless, forming ring structures. Metaphosphoric acids have theoretical mol ratios of water to phosphorus pentoxide of 2 or less. In practicing our invention, the acyclic species is formed by concentration of the ortho form; however, the concentration or dehydration of the acid is stopped before the meta species is formed, since not only is this species ineffective in preventing the formation of precipitates in neutral salt solutions, but metaphosphoric acid forms salts with the metal impurities which are also insoluble in the acid.

The empirical formula for the desired acyclic polyphosphoric acid is:

$$H_{n+2}P_nO_{3n+1}$$

where:

H represents hydrogen.
P represents phosphorus.
O represents oxygen, and $n$ is greater than 1.

When $n=2$, the species is commonly known as pyrophosphoric acid; when $n=3$, the species is tripolyphosphoric acid.

Prior-art processes and methods for the production of concentrated fertilizers have proved to be operative; however, the industry has long felt the need for a high-analysis solid fertilizer material which may be processed without the undesirable step of evaporating moisture therefrom. In addition, the industry has desired a material which may either be directly applied to the soil or more preferably be readily soluble in water for effecting the production of relatively high-analysis liquid fertilizers just prior to application to the soil. The desirability of having a high-analysis solid material which is readily soluble in water for the production of liquid fertilizers is evidenced in the prior art in efforts to dissolve diammonium phosphate in aqueous media for the production of liquid fertilizers. Liquid fertilizers so produced are limited to a maximum grade of about 8–24–0, whereas we have found that by dissolving the product of our invention we obtain a liquid fertilizer of grade 11–33–0 and higher.

Our invention is directed to a new composition of matter which is readily soluble in water and extremely useful as a starting material for the production of high-analysis liquid fertilizers.

We have overcome the disadvantages inherent in both liquid mixed and dry granular fertilizers of the type shown in the prior art to a substantial extent in the present invention by providing a composition of matter which contains up to 80 percent of its weight in the form of available plant food, and which is produced by a process of directly reacting anhydrous ammonia with concentrated phosphoric acid at elevated temperatures and pressures. Furthermore, several new, advantageous features over conventional dry mixed or liquid mixed fertilizer materials are realized by the present invention.

Among these advantages are convenience in the preparation of high-analysis liquid mixtures at or near the point of application to the soil and the sequestration of impurities in wet-process phosphoric acid. The composition of our invention has been found to have sequestration properties equal to those of superphosphoric acid and the 11–33–0 solution described in the above-mentioned Striplin et al. patent. In addition, the composition of our invention has advantages over the liquid mixed fertilizers mentioned above in economy and convenience of transportation and storage. Transportation of liquid fertilizers has been handicapped by lack of transportation equipment. The expense of storing liquid fertilizers also has prevented many manufacturers from obtaining their supply before the peak season. During the peak season, there are not enough tank cars or trucks available to transport liquid material. In addition, there exists the possibility of crystallization of stored superphosphoric acid and liquid mixed fertilizers in extremely cold weather.

The composition of our invention is free from these disadvantages, since it can be shipped in readily available boxcars and stored in open bins and it is unaffected by cold weather. Finally, the material of our invention is extremely water soluble.

As an illustration of the above-mentioned advantageous shipping economy of the material of our invention, it has been calculated that the freight on 1 ton of plant food in the form of an 11–33–0 solution of the type mentioned in the Striplin et al. patent from Sheffield, Ala., to Auburn, Wash., is about $65. However, the freight on 1 ton of plant food between the same two points in the form of the composition of our invention is only about $35.

It is therefore an object of the present invention to provide a new solid composition of matter and a process for its production, which composition contains unusually high amounts of available plant food.

Another object of the present invention is to provide a new solid composition of matter and a process for its production, which composition contains unusually high amounts of available plant foods and is readily soluble in water.

Still another object of the present invention is to provide a new solid composition of matter and a process for its production, which composition contains unusually high amounts of available plant food, which is readily soluble in water, and which may be either directly applied to the soil in dry form or dissolved in an aqueous medium for preparation of high-analysis liquid fertilizers.

A further object of the present invention is to provide a new solid composition of matter and a process for its production, which composition contains unusually high amounts of available plant food, which is readily soluble in water, which may be either directly applied to the soil in dry form or dissolved in aqueous medium for preparation of high-analysis liquid fertilizers, and which is easily prepared from readily available raw materials.

In carrying out the objects of our invention in one form thereof we employ a reactor vessel, a stirring means, and other equipment. Our reactor vessel and associated equipment incorporate a pressure system which is operated at pressures and temperatures substantially above atmospheric. We have found it most economical to employ this type of equipment for both batch- and continuous-mixing operations. Our invention, together with further objects and advantages thereof, will be better understood from a consideration of the following description, taken in connection with the accompanying drawings in which:

Figure 1:
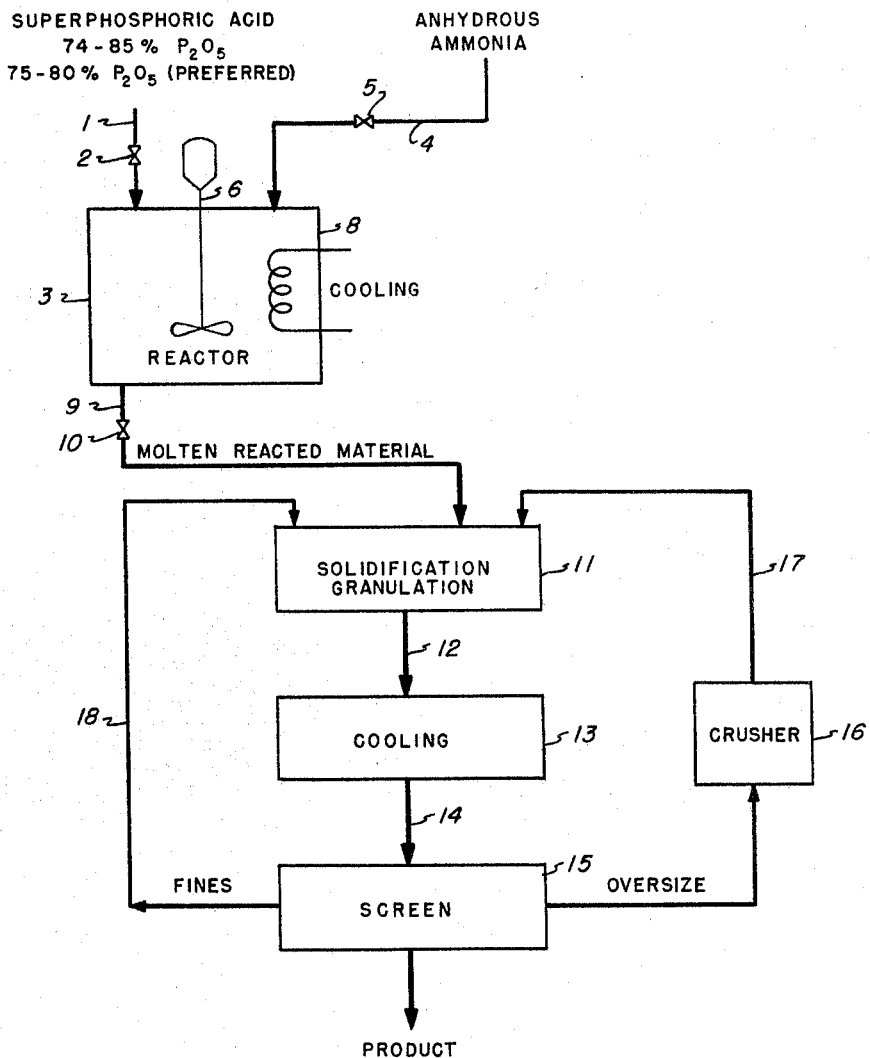
FIGURE 1 is a flowsheet illustrating principles of our process, which results in a solid fertilizer having the novel properties mentioned above.

Referring now more specifically to FIGURE 1, superphosphoric acid from a source not shown is fed through line 1 and any suitable means for controlling the rate of flow 2 into a reaction zone comprising vessel 3. Anhydrous ammonia from a source not shown is fed into vessel 3 through line 4 and means 5 for controlling the rate of flow. Vessel 3 is equipped with a motor-driven agitator 6 running at such speed as to secure rapid and intimate mixing of acid and anhydrous ammonia to keep the resulting mixture in vigorous agitation until reaction is complete. Cooling coils 8 are located within vessel 3 and may be disposed in a baffle-like arrangement to increase the degree of agitation resulting from the action of agitator 6. We prefer to introduce a stream of superphosphoric acid at a steady rate of flow according to the capacity of the equipment and to vary the rate of introduction of anhydrous ammonia as may be necessary to maintain the desired pressure of excess ammonia in the reactor.

The product is discharged from reactor vessel 3 through line 9 and any suitable means for controlling the rate of flow 10 as a melt which solidifies upon subsequent cooling. The molten material from reactor vessel 3 is discharged into solidifier and granulator 11, where it is subjected to agitation by stirring means not shown. It has been found that agitation in vessel 11 is required to cause the molten material to set up into hard granules. The resulting hard granules are fed through line 12 into cooling means 13, which may comprise a rotary cooler or other conventional cooling equipment. The cooled, hard granular material travels from cooling means 13 via line 14 to a screening means generally illustrated as screens 15 and crusher 16. The crushed oversize material and the fine material are returned to granulator 11 via lines 17 and 18, respectively.

The acid fed to reactor vessel 3 may be either electric-furnace acid or concentrated wet-process acid. If electric-furnace acid is used, the concentration of $P_2O_5$ should be about 74 to 85 percent; however, products with superior physical properties are made when using acid containing 75 to 80 percent $P_2O_5$. Wet-process phosphoric acid can be used in this process in either batch-type or continuous-type operation. The desired concentration of the wet-process phosphoric acid will vary, depending upon the impurities present therein. When wet-process phosphoric acid is used, it is preferred that the acid contain about 65 to 75 percent $P_2O_5$. The pressure maintained in reactor vessel 3 may be in the range from about 10 up to about 1000 pounds per square inch, depending upon other variables present in the process. However, the preferred operating pressure range has been determined to be about 10 to 100 p.s.i.g. Increasing the pressure increases the degree of ammoniation, and the use of pressure in reactor 3 obviates any necessity for a scrubber or other means for controlling loss of ammonia.

In another embodiment of our invention, the use of pressure makes possible the use of automatic control of the feed rate of the ammonia to reactor 3. This is accomplished by using an automatic pressure-regulating valve in the ammonia feed line to control the pressure in the reactor. The flow of ammonia to reactor 3 will then automatically be equal to the amount that can be reacted under the conditions of operation.

The temperature in reactor 3 may be maintained in the range from about 325° F. to 475° F., with the preferred temperature range being about 350° F. to 385° F. Depending upon temperature and other variables, the retention time of the material in reactor vessel 3 may range from about 10 minutes to 3 hours, the preferred retention time being in the range of about 1 to 1.5 hours. We have found that increasing the retention time increases the degree of ammoniation of the product.

Motor-driven agitator 6 provides vigorous agitation in reactor vessel 3 and is required in order to effect intimate mixing of the anhydrous ammonia with the liquid ammonium polyphosphate in reactor 3. The intimate mixing so produced by agitator 6 has been found to increase the rate of reaction in vessel 3 and therefore the degree of ammoniation within a given retention time.

The hard, granular product of our invention is hereinafter referred to as ammonium polyphosphate. Microscopic and chemical examinations of products from various tests using 76 percent $P_2O_5$ phosphoric acid (superphosphoric acid) indicate that the product contains about 51 percent to 61 percent monoammonium orthophosphate, $NH_4H_2PO_4$; about 38 percent to 46 percent tetra-ammonium pyrophosphate, $(NH_4)_4P_2O_7$; and about 2 percent to 3 percent more highly condensed acyclic ammonium polyphosphates. The 2 to 3 percent of more highly condensed phosphates consisted of a gel. Identification of such an amorphous material by microscopic or X-ray methods were not possible. The fact that this small percentage was more highly condensed than pyrophosphate was determined by paper chromatography.

Several products made from 76 percent $P_2O_5$ phosphoric acid are defined and described in Table I.

enon as the pyrophosphate has more sequestering power than the higher polyphosphates such as tripoly-, tetrapolyphosphates, etc. This greater sequestering power means that less of the ammonium polyphosphate would be needed to sequester the impurities in liquid fertilizers made with wet-process phosphoric acid, or the sequestration would be more complete with the same amount of ammonium polyphosphate.

Re-examination of data reported earlier indicates that the distribution of the phosphate species in solid ammonium polyphosphates was quite different from the distribution in the superphosphoric acids used in their manufacture. Additional tests have been made of the production of ammonium polyphosphate containing 6 pounds of ammonia per unit of $P_2O_5$ with acids of 76, 78, and 80 percent $P_2O_5$ contents to verify and extend the results. Conditions and results of the current tests are shown in Table II.

Ammoniation of the acids resulted in a shift of most of the tri- and more condensed polyphosphates to pyrophosphate. The acids originally contained 40 to 45 percent of their $P_2O_5$ as pyrophosphate. A relatively small proportion of the $P_2O_5$ (10% by weight) was present as tri- and more highly condensed polyphosphates in acid of 76 percent $P_2O_5$ content, but the product made from this acid contained 54 percent of its $P_2O_5$ as pyrophosphate. Acids of 78 and 80 percent $P_2O_5$ content contained larger proportions of their $P_2O_5$ as tri- and more condensed polyphosphates (29 and 47%, respectively); products made from these acids contained about 80 percent of their $P_2O_5$ as pyrophosphates. The products were water soluble and could be crushed and screened without difficulty.

The production of ammonium polyphosphate containing a large proportion of its $P_2O_5$ as pyrophosphate may be of particular advantage because of the apparently superior sequestering power of pyrophosphate over more highly condensed polyphosphates, i.e. superphosphoric acids and liquid fertilizers prepared therefrom do not contain more than 50 percent of their $P_2O_5$ as pyrophosphate.

In a preliminary test with a still more highly condensed superphosphoric acid (83 percent $P_2O_5$ acid) the product had a low degree of ammoniation (4.9 lb. $NH_3$/unit of $P_2O_5$). The change in distribution of the phosphates was different than in the tests with less concentrated acids. A substantial portion of the tri- to nonapolyphosphates was converted to species more condensed than nonapolyphosphates (Table II). Thus, it appears that the observed shift to a material containing unusually high amounts of the pyrophosphate species occurs only when the superphosphoric acid used contains a $P_2O_5$ concentration in the somewhat narrow range of about 78 percent TABLE I.—DESCRIPTION OF AMMONIUM POLYPHOSPHATE PRODUCT MADE FROM 76 PERCENT $P_2O_5$ PHOSPHORIC ACID

| Test No. | Chemical analysis | | | Product composition, percent | | |
| --- | --- | --- | --- | --- | --- | --- |
| | N, percent | $P_2O_5$, percent | Ortho $P_2O_5$, percent of total $P_2O_5$ | $NH_4H_2PO_4$ | $(NH_4)_4P_2O_7$ | Higher ammonium polyphosphates |
| A | 17.3 | 59.8 | 55 | 54 | 44 | 2 |
| B | 17.7 | 58.1 | 58 | 56 | 41 | 3 |
| C | 18.0 | 59.1 | 53 | 51 | 46 | 2 |
| D | 17.7 | 59.1 | 54 | 54 | 43 | 3 |
| E | 17.2 | 59.4 | 61 | 60 | 38 | 3 |
| F | 17.8 | 59.4 | 54 | 52 | 45 | 3 |

When acid with $P_2O_5$ concentration of 78 to 80 percent was used, product containing 86 to 88 percent ammonium pyrophosphate was made. The remainder of the product was ammonium orthophosphate. The pyrophosphate content was surprisingly high and indicated that a shift toward pyrophosphate took place during the ammoniation of the acid. This is a fortunate and useful phenomto 80 percent by weight, whereas superphosphoric acids utilized which are either more highly condensed or less condensed, i.e. contain greater than 80 percent $P_2O_5$ or less than 78 percent $P_2O_5$, do not when ammoniated, according to our teachings, exhibit this shift of the various species toward the pyrophosphate member.

In addition, we have found that when we prepare ammonium polyphosphates through the use of super acid containing in the range of 78 percent to 80 percent $P_2O_5$ the resulting material which displays this unexpected shift toward the high pyrophosphate content is an excellent intermediate composition for a simple and direct production of reagent grade ammonium pyrophosphate. We have found that the solid material from our process which is made from acid originally containing in the range of 78 to 80 percent $P_2O_5$ may be so utilized in the production of reagent grade ammonium pyrophosphate in the following manner. The material may be mixed with a minimum amount of water to produce a relatively thick slurry. The slurry is then subsequently slowly ammoniated so as to produce large and easily filterable crystals of triammonium pyrophosphate monohydrate. Following this procedure we have found that at least 70 percent of the phosphate can be recovered as a reagent grade ammonium pyrophosphate. If desirable, the solution phase which is left may be either directly used as a fertilizer or may be returned as recycle to the production of ammonium polyphosphate. This procedure for producing reagent grade ammonium pyrophosphate, due to its relative simplicity, is at the present time the most desirable method of which we are aware. Other methods of the prior art, although useful, are, for the most part, quite tedious for producing a desired reagent grade. One of such prior art methods is that shown in a copending application of James R. Lehr, Serial No. 361,624, filed April 20, 1964, which process is concerned with the production of ammonium pyrophosphate by the metathetical reaction between fluoride and various calcium pyrophosphates or calcium acid pyrophosphate compounds.

The reactor for producing the ammonium polyphosphate was constructed of stainless steel (A.I.S.I. Type 316) and was of 1-gallon capacity. It was equipped with a turbine-type agitator and four baffles ½ inch in width by 11 inches high. Acid was fed from an overhead tank (25-gallon capacity) with a reciprocating piston-type pump. The length of stroke of the piston could be varied to give the desired feed rate. The acid was fed at rates to give 10 to 30 pounds of product per hour.

Gaseous ammonia was fed through a ½-inch line from pressure cylinders located outside the laboratory building. Warm water was sprayed on the cylinders to obtain pressures of up to about 325 p.s.i.g. as required. The ammonia was fed into the reactor through a ⅜-inch tube. The tube was closed at the end, and a one-hole sparger was made by drilling a 0.052-inch hole at the end of the tube. The sparger was located near the bottom of the reactor under the tip of the agitator. The reactor was equipped with a pressure gage, and the rate of feed of ammonia to the reactor was controlled manually with a throttling valve to give the desired pressure of excess ammonia in the reactor. The temperature was measured with a thermocouple and a recording potentiometer.

Since the reaction of ammonia and superphosphoric acid was highly exothermic, it was necessary to provide cooling. Hot water was used for cooling to prevent freezing of material on the cooling coil (freezing point of about 325° F.). The cooling coil was made of ⅜-inch stainless steel (A.I.S.I. Type 316) tubing. It provided 1 square foot of cooling area based on the external surface of the coil. The water was pumped through the cooling coil and discharged into a 1.5-gallon tank, from which it was recycled. This arrangement provided for utilizing the heat of reaction to heat the makeup water. The supply of cooling water in the tank remained at 212° F. Water was added to the supply tank as required to replace that evaporated.

Two electrical conductivity probes (electrodes), entering from the top of the reactor, were used to measure the level of the liquid in the reactor. The tips of the probes were ½ inch apart vertically. Each probe and the shell of the reactor formed a conductivity circuit. The liquid in the reactor completed the circuit when it touched a probe and caused a light bulb to burn. The reactor was operated to keep the level between the two probes, which was indicated by the top light being off and the other on. The level was controlled by the rate of drawoff of liquid from the bottom of the reactor by use of a ¼-inch throttling valve.

In the initial tests it was found that the degree of agitation in the reactor had a significant effect on the degree of ammoniation. The reactor first was equipped with a six-blade agitator impeller that was 2½ inches in diameter with blades ½ inch in width located one agitator diameter above the bottom of the reactor. The agitator was rotated at 600 r.p.m., and the degree of ammoniation was TABLE II.—PRODUCTION OF AMMONIUM POLYPHOSPHATE: CHANGE IN DISTRIBUTION OF PHOSPHATE SPECIES ON AMMONIATION

| SUPERPHOSPHORIC ACID | | | | | | | |
|---|---|---|---|---|---|---|---|
| Total $P_2O_5$, percent by wt | 76.1 | | 78.1 | | 80 | | 83.5 |
| Distribution of phosphate species in acid,[a] percent of total $P_2O_5$ as: | | | | | | | |
| Orthophosphate | 48 | | 26 | | 14 | | 5 |
| Pyrophosphate | 42 | | 45 | | 39 | | 17 |
| Tri- to nonapolyphosphate | 10 | | 29 | | 47 | | 69 |
| Higher than nonapolyphosphate | 0 | | 0 | | 0 | | 9 |
| REACTION CONDITIONS | | | | | | | |
| Type of operation | Continuous | | Continuous | | Batch | | Continuous |
| Acid feed temperature, °F | 80 | 215 | 85 | 220 | 80 | 350 | 215 |
| Ammoniation temperature, °F | 375 | 375 | 425 | 425 | [b]230 | [b]400 | 475 |
| Ammoniation pressure, p.s.i.g | 25 | 25 | 25 | 25 | [b]80 | [b]86 | 25 |
| Retention time, min | 30 | 30 | 30 | 30 | 215 | 180 | 30 |
| AMMONIUM POLYPHOSPHATE | | | | | | | |
| Distribution of phosphate species, percent of total $P_2O_5$ as: | | | | | | | |
| Orthophosphate | 42 | 43 | 16 | 16 | 14 | 16 | 9 |
| Pyrophosphate | 54 | 54 | 82 | 82 | 84 | 76 | 31 |
| Tri- to nonapolyphosphate | 4 | 3 | 2 | 2 | 2 | 8 | 24 |
| Higher than nonapolyphosphate | 0 | 0 | 0 | 0 | 0 | 0 | 36 |
| Chemical analysis, percent by wt.: | | | | | | | |
| Total N | 15.3 | 15.4 | 15.3 | 15.4 | 15.7 | 16.4 | 14.1 |
| Total $P_2O_5$ | 62.4 | 61.6 | 63.6 | 63.8 | 64.2 | 62.8 | 69.3 |
| Pounds $NH_3$/unit $P_2O_5$ | 6.0 | 6.1 | 5.9 | 5.9 | 6.0 | 6.3 | 4.9 |
| Water-soluble $P_2O_5$, percent of total $P_2O_5$ | 100 | 100 | 100 | 100 | 100 | 100 | ---------- |

[a] Distribution of phosphate in 78.1 percent $P_2O_5$ acid obtained by chromatographic analysis; distribution in other acids obtained from Can. J. Chem. 34, 785–97 (1956).
[b] Maximum values.

only about 5 pounds of ammonia per unit of $P_2O_5$. Increasing the width of the agitator blades to 2 inches increased the degree of ammoniation to 6.3 pounds of ammonia per unit of $P_2O_5$ when the speed of the agitator was 600 r.p.m. A further increase in degree of ammoniation to 7.5 pounds of ammonia per unit of $P_2O_5$ resulted when the speed of the agitator was increased to 1730 r.p.m. No further increase was obtained when the speed of the agitator was increased to 2130 r.p.m. Effects of operating variables on the degree of ammoniation in tests of the production of ammonium polyphosphates are given in Table III.

pressure, temperature, and retention time which may be used to obtain a given degree of ammoniation. To obtain the highest degree of ammoniation high pressure, low temperature, and long retention time should be used; however, the physical limitation of retaining a fluid melt that can be agitated must be met in setting the conditions of operation.

In order that those skilled in the art may better understand how the present invention can be practiced, the following examples are given by way of illustration and not by way of limitation.

TABLE III.—EFFECTS OF OPERATING VARIABLES ON DEGREE OF AMMONIATION

EFFECT OF AGITATION

| Speed of agitator,[1] r.p.m. | Temperature, °F. | Pressure, p.s.i.g. | Retention time, minutes | Product composition | | Lb. $NH_3$/ unit $P_2O_5$ |
|---|---|---|---|---|---|---|
| | | | | N | $P_2O_5$ | |
| 600 [2] | 370 | 140 | 60 | 12.9 | 64.2 | 4.9 |
| 600 | 350 | 130 | 63 | 15.9 | 61.5 | 6.3 |
| 1,020 | 375 | 200 | 59 | 16.7 | 62.0 | 6.5 |
| 1,520 | 400 | 200 | 62 | 17.7 | 60.4 | 7.1 |
| 1,730 | 390 | 200 | 63 | 18.2 | 59.2 | 7.5 |
| 2,130 | 395 | 200 | 55 | 18.0 | 59.8 | 7.3 |

EFFECT OF PRESSURE

| | | | | | | |
|---|---|---|---|---|---|---|
| 2,130 | 415 | 25 | 60 | 14.4 | 61.8 | 5.7 |
| 2,130 | 415 | 100 | 60 | 15.7 | 61.4 | 6.2 |
| 2,130 | 415 | 150 | 60 | 16.1 | 61.4 | 6.4 |
| 2,130 | 415 | 175 | 60 | 16.8 | 61.1 | 6.7 |
| 2,130 | 415 | 200 | 60 | 18.2 | 59.8 | 7.4 |
| 2,130 | 415 | 300 | 60 | 18.3 | 59.2 | 7.5 |

EFFECT OF TEMPERATURE

| | | | | | | |
|---|---|---|---|---|---|---|
| 2,130 | 365 | 25 | 60 | 17.3 | 59.8 | 7.0 |
| 2,130 | 380 | 25 | 60 | 16.1 | 61.1 | 6.4 |
| 2,130 | 395 | 25 | 60 | 15.9 | 61.5 | 6.3 |
| 2,130 | 410 | 25 | 60 | 14.5 | 62.5 | 5.6 |
| 2,130 | 450 | 25 | 60 | 13.6 | 62.7 | 5.3 |

EFFECT OF RETENTION TIME

| | | | | | | |
|---|---|---|---|---|---|---|
| 2,130 | 350 | 25 | 30 | 17.0 | 60.6 | 6.8 |
| 2,130 | 365 | 25 | 60 | 17.3 | 59.8 | 7.0 |
| 2,130 | 370 | 25 | 90 | 17.8 | 59.7 | 7.2 |

[1] Agitator was 2.5 inches in diameter and 2 inches wide except as noted in footnote 2.
[2] Agitator, 2.5 inches in diameter and ½ inch wide.

Figure 3:
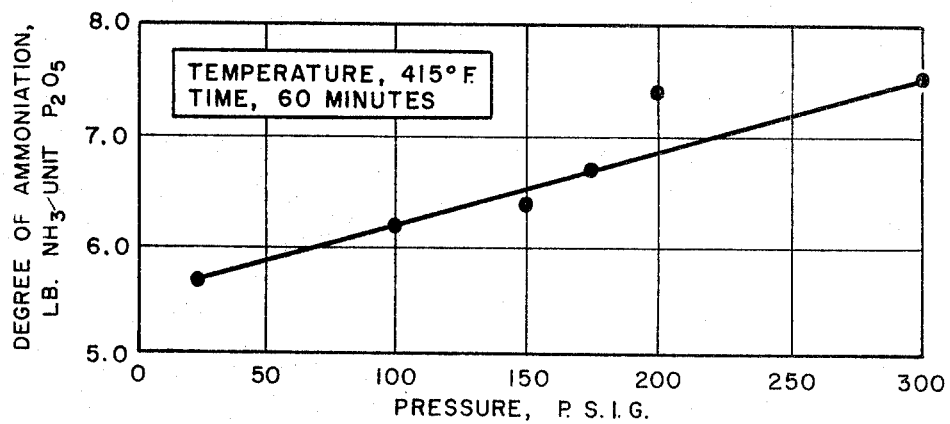
FIGURE 3 is a graphical illustration showing the effect of pressure on the degree of ammoniation of ammonium polyphosphate.
Figure 2:
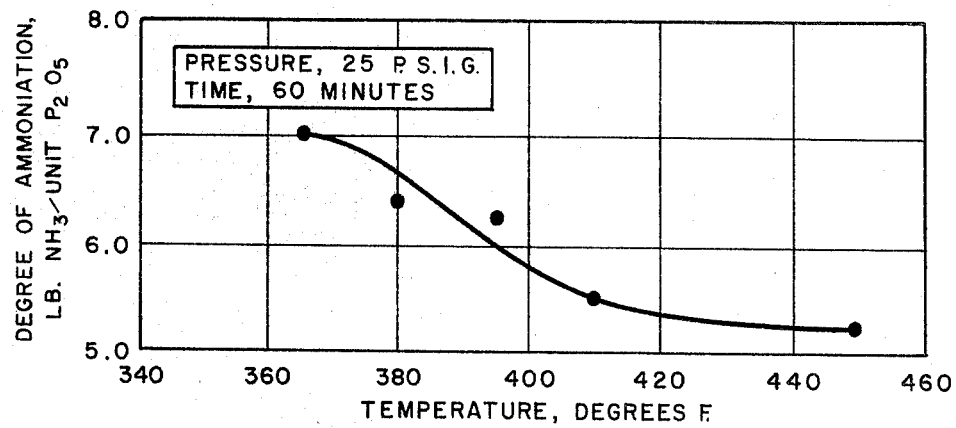
FIGURE 2 is a graphical illustration showing the effect of reaction temperature on the degree of ammoniation of ammonium polyphosphate.

Temperature and pressure were related in their effects on the degree of ammoniation and on the freezing point of the melt in the reactor. At pressures of 300 p.s.i.g., it was necessary to keep the temperature at 415° F. so that the melt would be fluid; at pressures of 25 p.s.i.g, temperatures as low as 365° F. could be used. The tests were made with an agitator speed of 2130 r.p.m. and a retention time of about 60 minutes. The results are shown in Table III and FIGURES 2 and 3.

The effect of pressure was measured at a reaction temperature of 415° F. Increasing the pressure from 25 to 300 p.s.i.g. increased the degree of ammoniation from 5.7 to 7.5 pounds of ammonia per unit of $P_2O_5$.

Tests of the effect of temperature were made at a pressure of 25 p.s.i.g. Increasing the temperature from 365° F. to 450° F. decreased the degree of ammoniation from 7.0 to 5.3 pounds of ammonia per unit of $P_2O_5$.

At a reactor pressure of 25 p.s.i.g. and temperatures of 350° F. to 370° F., as the retention time was increased from 30 to 90 minutes, the degree of ammoniation increased from 6.8 to 7.2 pounds of ammonia per unit of $P_2O_5$.

It is apparent that there are several combinations of

*Example I*

Superphosphoric acid (76% $P_2O_5$) was fed to the reactor at the rate of 2.6 pounds per hour. The flow of ammonia was regulated to give a pressure of 300 p.s.i.g. in the reactor. This resulted in a flow rate of 0.7 pound of ammonia per hour. The volume of the liquid retained in the reactor was 0.7 gallon. The retention time of the liquid in the reactor was 168 minutes. The temperature in the reactor (380° F.) was controlled by regulating the flow of water through the cooling coil. The agitator (2¼ in., six-blade impeller) was rotated at 1000 r.p.m. Liquid product was discharged from the reactor at the rate of 3.3 pounds per hour. After collecting 9 pounds of liquid product, it was agitated with a propeller-type stirrer for 15 minutes until it solidified. The solid material was crushed and sampled for analysis. The analysis showed a nitrogen content of 17.9 percent and a $P_2O_5$ content of 60.8 percent. The product was hard. It remained dry and free flowing even after exposure to a humid atmosphere.

*Example II*

In a run made in a reactor device similar to that described in Example I, the following results were obtained.

TEST NO. 1
Superphosphoric acid concentration, percent $P_2O_5$ _ 75.9
Feed rate, lb./hr.:
    Superphosphoric acid _____ 25.0
    Anhydrous ammonia _____ 6.1
Reactor:
    Agitator speed, r.p.m. _____ 1000
    Temperature, ° F. _____ 420
    Pressure, p.s.i.g. _____ 300
    Retention time, minutes _____ 18
    Discharge rate, lb./hr. _____ 31.1
Product grade _____ 15.9–61.0–0

The analysis of the above product indicates a fertilizer material of about 16–61–0 grade, and the material produced in this run remained dry and free flowing even after exposure to a humid temperature.

Example III

The results of another run made in a reactor device similar to that described in Example I are given below.

TEST NO. 2
Superphosphoric acid concentration, percent $P_2O_5$ _ 76.1
Feed rate, lb./hr.:
    Superphosphoric acid _____ 3.8
    Anhydrous ammonia _____ 0.9
Reactor:
    Agitator speed, r.p.m. _____ 1000
    Temperature, ° F. _____ 340
    Pressure, p.s.i.g. _____ 10
    Retention time, minutes _____ 118
    Discharge rate, lb./hr. _____ 4.7
Product grade _____ 16.6–62.5–0

The analysis of the above product indicates a fertilizer material of about 17–63–0 grade, and the material produced in this run remained dry and free flowing even after exposure to a humid atmosphere.

Example IV

In still another run made in a reactor similar to that described in Example I, the following results were obtained.

TEST NO. 3
Superphosphoric acid concentration, percent $P_2O_5$ _ 75.7
Feed rate, lb./hr.:
    Superphosphoric acid _____ 27.4
    Anhydrous ammonia _____ 6.3
Reactor:
    Agitator speed, r.p.m. _____ 1000
    Temperature, ° F. _____ 350
    Pressure, p.s.i.g. _____ 240
    Retention time, minutes _____ 16
    Discharge rate, lb./hr. _____ 33.7
Product grade _____ 15.4–61.5–0

The analysis of the material made in this run indicated a fertilizer material of grade of about 15–62–0, and the material so produced remained dry and free flowing even after exposure to a humid atmosphere.

Example V

The following results were obtained in another run made in a reactor device similar to that described in Example I.

TEST NO. 4
Superphosphoric acid concentration, percent $P_2O_5$ _ 76.4
Feed rate, lb./hr.:
    Superphosphoric acid _____ 4.9
    Anhydrous ammonia _____ 1.4
Reactor:
    Agitator speed, r.p.m. _____ 2130
    Temperature, ° F. _____ 370
    Pressure, p.s.i.g. _____ 25
    Retention time, minutes _____ 90
    Discharge rate, lb./hr. _____ 6.3
Product grade _____ 17.8–59.7–0

The analysis of the material made in this run indicated a fertilizer material of a grade of about 18–60–0, and the material so produced remained dry and free flowing even after exposure to a humid atmosphere.

Example VI

The results of yet another run are given below. The reactor in which this run was made was a device similar to that described in Example I.

TEST NO. 5
Superphosphoric acid concentration, percent $P_2O_5$ _ 76.3
Feed rate, lb./hr.:
    Superphosphoric acid _____ 6.9
    Anhydrous ammonia _____ 1.9
Reactor:
    Agitator speed, r.p.m. _____ 2130
    Temperature, ° F. _____ 365
    Pressure, p.s.i.g. _____ 25
    Retention time, minutes _____ 60
    Discharge rate, lb./hr. _____ 8.8
Product grade _____ 17.3–59.8–0

The product material analyzed about 17–60–0, and it remained dry and free flowing even after exposure to a humid atmosphere.

Example VII

The following results were obtained in yet another run made in a reactor device similar to that described in Example I.

TEST NO. 6
Superphosphoric acid concentration, percent $P_2O_5$ _ 76.1
Feed rate, lb./hr.:
    Superphosphoric acid _____ 7.9
    Anhydrous ammonia _____ 2.2
Reactor:
    Agitator speed, r.p.m. _____ 2130
    Temperature, ° F. _____ 415
    Pressure, p.s.i.g. _____ 300
    Retention time, minutes _____ 60
    Discharge rate, lb./hr. _____ 10.1
Product grade _____ 18.3–59.2–0

Granulation conditions were as follows: The molten slurry was sprayed through a nozzle directly onto a bed of recycled fines in a laboratory-size pugmill. Recycled fines (−12 mesh, Tyler) were fed to the pugmill by a disk feeder. The recycle rate was 110 pounds per hour or 3.3 pounds per pound of product. The temperature of the material discharged from the pugmill was 185° F. The screen analysis (Tyler) of the material from the pugmill was as follows:

| Percent | | | |
|---|---|---|---|
| +6 | −6 +8 | −8 +12 | −12 |
| 23.1 | 16.8 | 24.6 | 35.5 |

The product was hard, dry, and free flowing even after exposure to a humid atmosphere.

Example VIII

Wet-process phosphoric acid which had been highly concentrated (71.4% $P_2O_5$) was reacted batchwise with gaseous ammonia in a pressure-type reactor equipped with a propeller-type agitator. The procedure used is given below.

The acid (200 g.) was added to the reactor, and the reactor was closed. The reactor was then heated to 200° F. Gaseous ammonia (45 g.) was added at an average rate of 1.3 grams per minute for 35 minutes. At this time the reactor temperature had risen to a maximum of 325° F., and the pressure was 65 pounds p.s.i.g. Feeding of ammonia and agitation were discontinued at this time, the pressure was released, and the fluid mixture was poured out of the reactor. A longer period of reaction and agitation would have resulted in solidification of the material in the reactor. The fluid material from the reactor was agitated by hand stirring until the material became hard. Analysis of the product gave a nitrogen content of 15.2 percent and a $P_2O_5$ content of 58.4 percent. The material was hard and free flowing.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by letters patent of the United States is:

1. A process for the production of reagent grade ammonium pyrophosphate from anhydrous ammonia and highly concentrated phosphoric acid, which process comprises the steps of maintaining in a closed reaction vessel at a temperature in the range from about 300° F. to about 500° F. and under a constant positive pressure in the range from about 10 p.s.i.g. to about 1000 p.s.i.g. a mass of molten material of low viscosity previously formed by combining in said closed reaction vessel said anhydrous ammonia with said highly concentrated phosphoric acid, said highly concentrated phosphoric acid containing in the range from about 78 percent by weight $P_2O_5$ to about 80 percent by weight $P_2O_5$; continuously combining relatively small streams of said anhydrous ammonia and said highly concentrated phosphoric acid into said mass; continuously vigorously agitating said mass thereby keeping substantially the entire mass well agitated and effecting immediate ammoniation of said inflowing acid; withdrawing from the bottom of said mass surplus molten ammonium phosphate material; combining said withdrawn ammonium polyphosphate material with aqueous medium to form a slurry therewith; subsequently adjusting the pH of said slurry by the ammoniation thereof to a final pH in the range from 5.0 to 6.3 thereby effecting a recrystallization of the diammonium pyrophosphate phase to the triammonium pyrophosphate monohydrate in the form of easily filtrable crystals thereof; and separating said crystals of triammonium pyrophosphate monohydrate as product.

2. A new composition of matter containing a total plant food content ($N+P_2O_5$) in the range from about 78 percent to about 80 percent by weight and consisting essentially of a solid mixture of solid water-soluble salts containing about 14 percent to about 16 percent monoammonium orthophosphate, $NH_4H_2PO_4$; from about 76 percent to about 84 percent ammonium pyrophosphate, $(NH_4)_x(H_{4-x})P_2O_7$; and from about 2 percent to 8 percent of the more highly condensed acyclic ammonium polyphosphates in the group comprising ammonium tripolyphosphate through ammonium nonapolyphosphate.

References Cited by the Examiner
UNITED STATES PATENTS

| | | | |
|---|---|---|---|
| 1,699,093 | 1/1929 | Carothers | 23—106 |
| 2,105,446 | 1/1938 | Wilson | 23—106 |
| 2,288,418 | 6/1942 | Partridge | 23—106 |
| 2,592,273 | 4/1952 | Goebel | 23—106 |
| 2,856,279 | 10/1958 | Hignett | 23—106 |
| 3,005,696 | 10/1961 | Hignett | 71—64 |

DONALL H. SYLVESTER, *Primary Examiner.*

T. D. KILEY, *Assistant Examiner.*